United States Patent
Marvin

[11] Patent Number: 5,808,880
[45] Date of Patent: Sep. 15, 1998

[54] POWER FACTOR CONTROLLER FOR ACTIVE CONVERTER

[75] Inventor: Daryl J. Marvin, Unionville, Conn.

[73] Assignee: Otis Elevator Company, Farmington, Conn.

[21] Appl. No.: 701,914

[22] Filed: Aug. 30, 1996

[51] Int. Cl.[6] .................................................. H02M 5/458
[52] U.S. Cl. .............................. 363/37; 318/803; 323/207
[58] Field of Search .................................. 363/35, 37, 51; 323/207, 208, 209, 210, 211; 318/376, 801, 802, 803, 804

[56] References Cited

U.S. PATENT DOCUMENTS

| | | |
|---|---|---|
| 3,609,509 | 9/1971 | Lafuze . |
| 4,096,557 | 6/1978 | Schwarz . |
| 4,222,096 | 9/1980 | Capewell . |
| 4,356,440 | 10/1982 | Curtiss et al. . |
| 4,590,416 | 5/1986 | Porche et al. . |
| 4,620,272 | 10/1986 | Fulton et al. ............................. 363/37 |
| 4,855,890 | 8/1989 | Kammiller . |
| 4,982,147 | 1/1991 | Lauw . |
| 5,187,427 | 2/1993 | Erdman . |
| 5,204,606 | 4/1993 | Kuwahara et al. . |
| 5,206,575 | 4/1993 | Nakamura et al. . |
| 5,241,256 | 8/1993 | Hatanaka et al. . |
| 5,369,353 | 11/1994 | Erdman .................................... 323/207 |
| 5,446,646 | 8/1995 | Miyazaki .................................. 363/89 |
| 5,479,336 | 12/1995 | Motoki et al. . |
| 5,535,113 | 7/1996 | Konishi .................................... 363/35 |
| 5,537,307 | 7/1996 | Hirose et al. ............................. 363/98 |
| 5,585,708 | 12/1996 | Richardson et al. .................... 318/807 |
| 5,610,501 | 3/1997 | Nelson et al. ........................... 323/207 |
| 5,621,628 | 4/1997 | Miyazaki et al. ........................ 363/37 |
| 5,646,511 | 7/1997 | Akamatsu et al. ...................... 323/207 |

*Primary Examiner*—Adolf Berhane
*Assistant Examiner*—Derek J. Jardieu

[57] ABSTRACT

A method and apparatus for controlling a regenerative drive having line and load converters connected by a DC link, the load converter for connection to an AC machine, and the line converter for connection to an AC source/sink by means of line reactors, the drive for causing real power to flow in the line reactors to control the DC link voltage at a selected DC voltage and for determining when a commanded line converter voltage exceeds a selected maximum line converter voltage for also causing reactive power to flow in the line reactors to reduce the line converter voltage required to control the real power flow.

5 Claims, 3 Drawing Sheets

POWER FACTOR CONTROLLER FOR ACTIVE CONVERTER

TECHNICAL FIELD

The present invention relates to regenerative drives and, more particularly, to controlling a DC link thereof at a selected high value.

BACKGROUND OF THE INVENTION

A regenerative drive typically includes a line converter connected by means of a DC link to a load converter. The load converter is intended to be connected to an AC machine, while the line converter is intended to be connected to an AC source/sink. In motoring mode, power from the AC source/sink powers the line converter which converts AC to DC for the DC link, and the load converter in turn converts DC to AC for driving the AC machine as a motor. In regenerative mode, the AC machine generates AC which the load converter converts to DC, which the line converter then converts back to AC and delivers to the AC source/sink as power thereto.

In regenerative drives with active line converters, the DC bus is controlled to a fixed voltage independent of the AC line voltage. For example, the DC voltage could be desirably held at a high voltage, such as 750 VDC, which would allow sufficient margin for DC bus capacitors and converter switching devices, such as IGBTs. In such a design, the active line converter would be designed to operate as a boost converter, controlling the AC line current to be sine waves with unity power factor.

A problem exists when this type of converter is operated with 480 volts AC±10% AC lines. In such a case, AC line voltage can become high enough so that there is insufficient bus voltage on the line converter side of line reactors to control the AC line currents. In this case, the AC line currents can become uncontrolled, resulting in drive shutdown. The usual practice in the art is to avoid the problem by using a transformer on the voltage mains provided by the public utility in order to step down the voltage to around 440–460 VAC. However, this results in the use of an extra transformer which adds cost to the system and may adversely affect the level of DC voltage achievable on the DC link.

DISCLOSURE OF INVENTION

An object of the present invention is to enable the active, line converter to operate with significantly higher AC line voltage than would otherwise be possible.

Another object of the present invention is to allow the AC line current to be controlled to be sinusoidal with such high AC line voltages by introducing reactive power in the line reactors, thereby no longer holding the power factor to be unity, while at the same time maintaining sinusoidal voltages and currents.

According to a first aspect of the present invention, real power alone is caused to flow in line reactors connected between the AC source/sink and the line converter for controlling the DC bus voltage at the desired level until it is determined that the commanded line converter voltage or a sensed line converter voltage exceeds a maximum level, whereafter reactive power is caused to flow as well in the line reactors to reduce the line converter voltage required to control the real power flow.

According to a second aspect of the present invention, a method of controlling a regenerative drive having line and load converters connected by a DC link, the load converter for connection to an AC machine and the line converter for connection to an AC source/sink by means of line reactors, comprises the steps of controlling real power flow in the line reactors for controlling a voltage of the DC link at a selected magnitude by providing a line converter voltage command signal to control line controller AC voltage, and comparing the line converter voltage command signal to a selected maximum line converter voltage signal for providing a control signal for causing reactive power to flow in the line reactors to reduce the line controller AC voltage required to control the real power flow.

According to a third aspect of the present invention, a method of controlling a line converter of a regenerative drive for connection by means of line reactors to an AC source/sink, comprises the steps of comparing a commanded DC link voltage to an actual DC link voltage for providing a real current command signal, comparing the real current command signal to an actual real current command signal, for providing a real voltage command signal, comparing a maximum line converter voltage to a commanded line converter voltage, for providing an error signal, integrating the error signal without any proportional gain for providing a reactive current command signal, comparing the reactive current command signal to an actual reactive current command signal, for providing a reactive voltage command signal, processing the real voltage command signal and the reactive voltage command signal, for providing the commanded line converter voltage, and processing the real voltage command signal and the reactive voltage command signal, for providing line converter phase voltage command signals.

These and other objects, features and advantages of the present invention will become more apparent in light of the detailed description of a best mode embodiment thereof, as illustrated in the accompanying drawing.

BEST MODE FOR CARRYING OUT THE INVENTION

Although the following description shows a regenerative drive for use in a particular application, i.e., an elevator application, it should be realized by those of skill in the art that the principles hereof are applicable to other applications as well.

Figure 1:
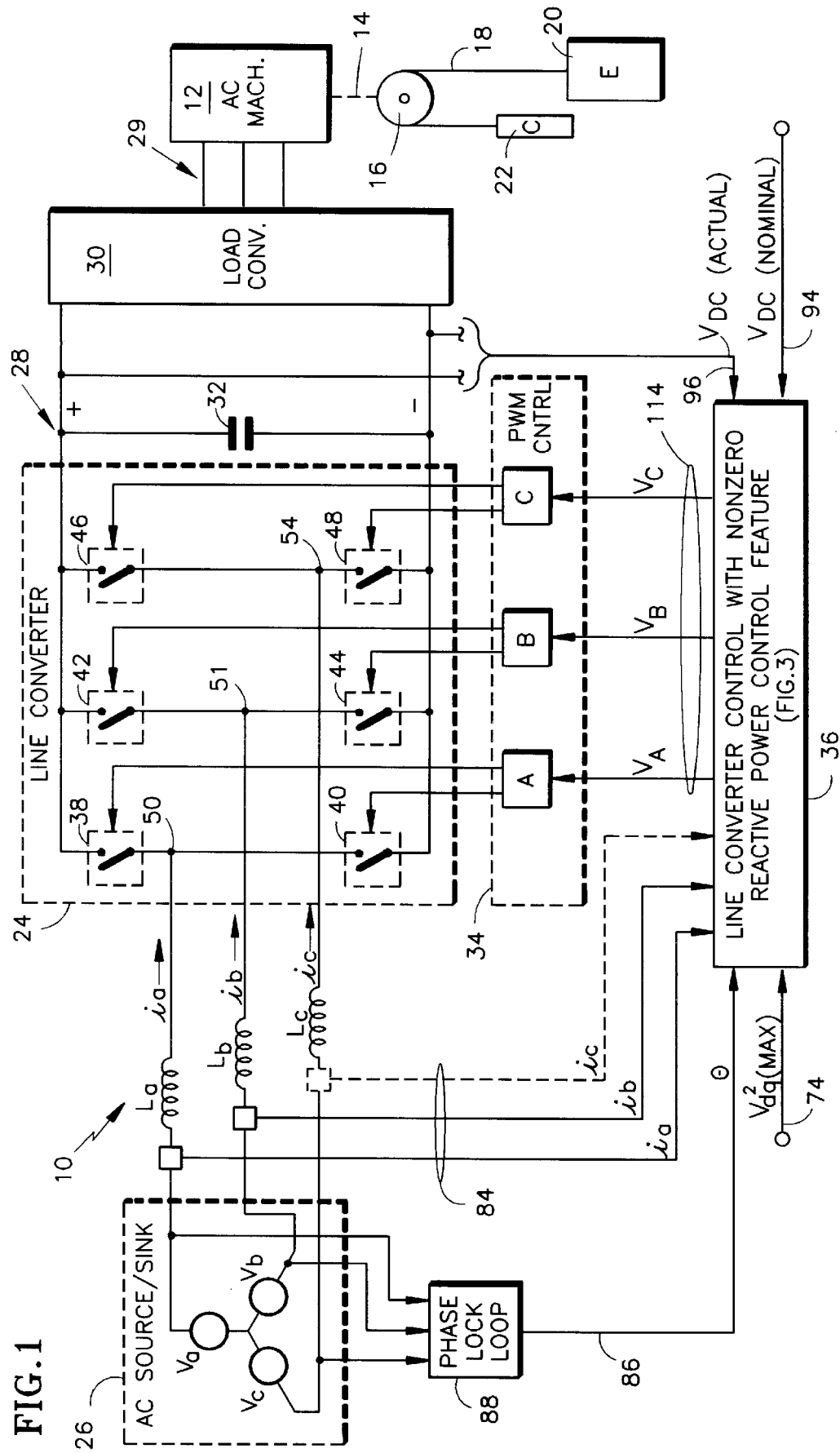
FIG. 1 shows a regenerative drive which may be used, for example, with an elevator application and having a line converter controller with a non-zero reactive power control feature, according to the present invention.

FIG. 1 shows a regenerative drive 10 for connection to an AC machine 12 having a shaft 14 connected to a sheave 16 in an elevator machine room. A cable or rope 18 is laid over the sheave 16 and is connected at one end to an elevator car 20 and at the other end to a counterweight 22, which altogether constitute a traction-type elevator for moving the car 20 and counterweight in opposite vertical directions in a hoistway in a well-known manner. The counterweight is typically sized in such a way that it equals the weight of a half-loaded elevator and can thereby result in the generation of power by the AC machine upon descent of the counterweight and release of stored potential energy therein when moving the elevator car up under a less-than-half-loaded condition.

In the past, for non-regenerative drives in general use such power would be directed to and dissipated in the machine room by a regenerative power resistor in the form of heat. Such a resistor requires a housing along with appropriate switching, and may lead to a need for air-conditioning or cooling fans in the machine room.

The regenerative drive 10 of FIG. 1, on the other hand, instead of a simple, one way rectifier, includes a two way line converter 24 connected to an AC source/sink 26 by means of three inductors $L_a$, $L_b$ and $L_c$, also known as line reactors. The line converter 24 permits regenerative power to flow back to the AC source acting as a sink. It is desired, for the purposes of the present invention, to use an AC source that would typically be available from the public utility power grid at 480 VAC±10 percent. It has, however, been a problem in general in the regenerative drive art (not just for elevators) to be able to successfully use such a high AC source voltage due to the available ratings of the semiconductor devices, usually IGBTs, and the available ratings of electrolytic capacitors, which are the preferred capacitors for connection between positive and negative legs of a DC bus 28 between the line converter 24 and a load converter 30, which is in turn connected to the AC machine 12 by AC lines 29.

When being used as a motor, the AC machine 12 receives AC power from the load converter 30 acting as an inverter for converting DC current as supplied by the DC bus 28 to AC for driving the AC machine. The load converter has an associated control which is not shown because it does not form any part of the present invention. A capacitor 32 serves to smooth out ripples that would otherwise exist on the DC bus 28. For an example, according to the present invention, the DC bus is designed and tested at 800 VDC, but the aim is to control it at 750 VDC. Such a capacitor is preferably electrolytic, having a capacitance of several thousand microfarads, e.g., 4,000–10,000 microfarads.

In the motoring case, the line converter 24 receives AC power from the AC source 26 and is controlled to act as a full wave bridge by a PWM control 34 in order to convert the alternating current from the AC source 26 into direct current for the DC bus 28 and thereby allow the load converter 30 to drive the AC machine 12 as a motor to either lower the elevator with less than half a load or raise it under a more than half-full load condition.

The reverse is true in the regenerative case, where the AC machine 12 acts as a generator, when the elevator car 20 is being moved upward under a less-then-half-full load condition by the release of the potential energy stored in the counterweight by virtue of its movement in the downward direction. In that case, three-phase AC power is delivered from the AC machine 12 on the lines 29 to the load converter 30, which in turn rectifies the AC power to DC for provision onto the DC bus 28 for subsequent conversion back to AC by the line converter 24 under the control of the PWM control 34.

In order for the AC power to be delivered in an acceptable form by the converter back to the AC source/sink 26, which would typically be a public utility acting as a sink, the power has to meet certain strict requirements including the absence of harmful harmonics and an acceptable power factor. Therefore, it is desirable in such cases to control the AC line current passing through the inductors $L_a$, $L_b$ and $L_c$ to be sine waves with unity power factor.

As suggested above, a problem exists when this type of converter is operated with 480 VAC±10 percent AC lines. Given the above described voltage rating constraints of IGBTs and capacitors forcing a desired 750 VDC bus voltage, in such a case, the AC line voltage can be high enough (528 VAC (rms)) so that there is insufficient bus voltage, on the line converter-side of the inductors, to control the AC currents properly. In such a case, the AC line currents can even become uncontrolled, resulting in drive shutdown. The solution in the art has generally been to use a transformer to reduce the AC line voltage to well below 480 VAC such as to around 440 to 460 VAC while still keeping the DC bus at a desired high value such as 750 VDC.

According to the present invention, a line converter controller 36 with a nonzero reactive power control feature enables the line converter 24 to operate with significantly higher AC line voltages than would otherwise be possible. In particular, the line converter controller 36 and signal processing methodology utilized therein allows the AC line current to be controlled to be sinusoidal even with high AC utility line voltages by departing from unity power factor in a controlled manner while at the same time maintaining stability. It does this by causing real power to flow while the AC utility line voltages are at normal levels, but when it is determined that the line converter is commanded to provide an AC voltage that exceeds a desired level or is detected as providing a voltage that exceeds the desired level (on account of the AC line voltage of the source rising within its ±10% band), causing reactive power to also flow in the line reactors between the AC sink and the line converter in order to reduce the line converter voltage required to control the real power flow. In other words, to allow the line converter voltage to achieve a desired magnitude without exceeding the above-mentioned real constraints, a reactive voltage component is added to the commanded voltage.

The line converter 24 of FIG. 1 is called an active converter and includes a plurality of switches 38, 40, 42, 44, 46, 48, each of which is, e.g., comprised of an IGBT and a flyback diode, which are well-known in the art, and which may be illustrated as simple open-and-shut switches, as shown. By proper switching of the IGBTs, the applied voltage at nodes 50, 52 and 54 can be controlled to control power factor. The line reactors $L_a$, $L_b$ and $L_c$ are inserted in the lines between the AC source 26 and the converter 24 to enable control of the phase currents. The needed applied voltage (neglecting resistances) is:

$$\overline{V}_{dq} = \sqrt{\frac{2}{3}} \; \overline{V}_{ac} + j\,\omega_l L \overline{I}$$

where
$\overline{V}_{dq}$ is the voltage vector applied at the converter
$\overline{V}_{ac} = V_{ac} + j0$ is the voltage vector of the AC line (in line-line rms)
$\overline{I} = I_q + jI_d$ is the current vector in the converter
$\omega_1$ is the frequency of the AC line
L is the inductance of the line reactor To obtain operation of the converter 24 at unity power factor, the component of the current vector out of phase with the AC line ($I_d$) is held to zero. The real component of the current vector in phase with the AC line ($I_q$) is used to control the bus voltage at the nodes 50, 52, 54 to the desired level ($V_{bus}$). In this case, the needed applied voltage at these three nodes is:

$$\overline{V}_{dq} = \sqrt{\frac{2}{3}}\ V_{ac} + j\ \omega_l L I_q$$

which has a magnitude of:

$$|\overline{V}_{dq}| = \sqrt{\left(\sqrt{\frac{2}{3}}\ V_{ac}\right)^2 - (\omega_l L I_q)^2}$$

The magnitude of the voltage applied to the converter ($|\overline{V}_{dq}|$) at the IGBTs is limited to ($V_{bus}/\sqrt{3}$). As a result, the maximum AC voltage that can be used and still enable control of the currents is:

$$V_{ac\_max} = \sqrt{\frac{3}{2}}\ \sqrt{\left(\frac{V_{bus}}{\sqrt{3}}\right)^2 - (\omega_l L I_q)^2}$$

If the component of the current vector out-of-phase with the vector line ($I_d$) is not held to zero, the magnitude of the converter voltage can be written as:

$$\begin{aligned}V_{dq}^2 &= \left(\sqrt{\frac{2}{3}}\ V_{ac} - \omega_l L I_d\right)^2 + (\omega_l L I_q)^2 \\ &= \left(\sqrt{\frac{2}{3}}\ V_{ac}\right)^2 + (\omega_l L I_q)^2 - \omega_l L I_d\left(2\sqrt{\frac{2}{3}}\ V_{ac} - \omega_l L I_d\right) \\ &\approx \left[\left(\sqrt{\frac{2}{3}}\ V_{ac}\right)^2 + (\omega_l L I_q)^2\right] - \left(2\omega_l L \sqrt{\frac{2}{3}}\ V_{ac}\right) I_d\end{aligned}$$

It can be seen from the approximation of this last equation that through the proper control of $I_d$, the needed converter voltage at nodes 50, 52, 54 can be reduced when appropriate. This technique allows reactive power to flow through the line reactor, which creates a voltage drop in phase with the AC line.

Assuming that the current controller is designed to operate in the synchronous reference frame, $V_{dq}^2$ can be easily computed from the output of the current regulators as:

$$V_{dq}^2(command) = V_d^2(command) + V_q^2(command)$$

Figure 2:
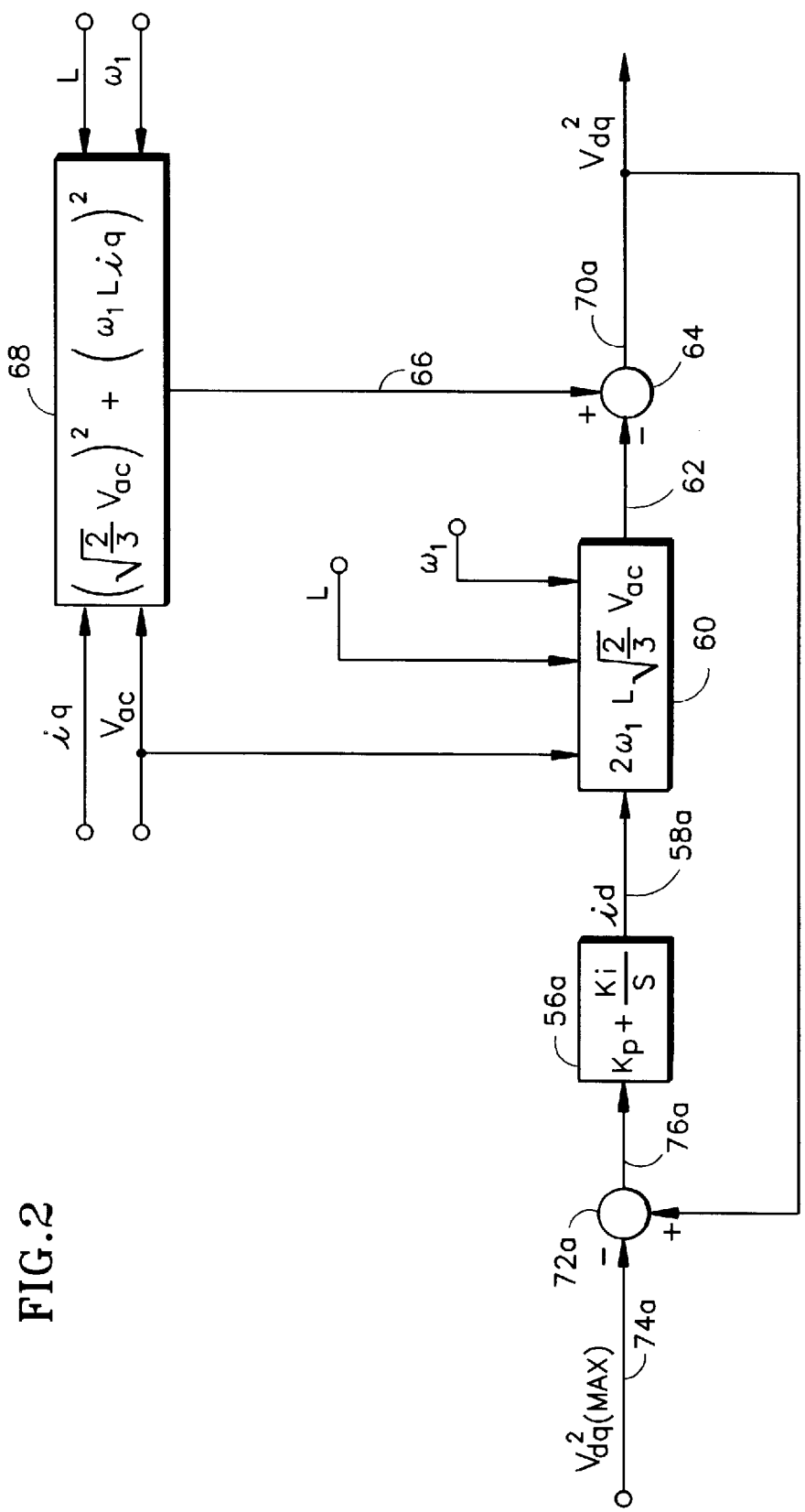
FIG. 2 shows a system-level block diagram of a central teaching of the present invention whereby reactive power is introduced in reaction to a high-level AC line voltage with a reactive power control loop having integral gain only.

A control loop can then be designed as shown in FIG. 2 to control $V_{dq}^2$ to not exceed the maximum permissible value ($V_{bus}^2/3$). Using the approximation for $V_{dq}^2$ as shown in the above approximation equation, showing the difference between $V_d^2$ and $V_q^2$, the control loop of FIG. 2 can be provided which achieves the desired result. This control loop model ignores many details of the actual system, including loop delays, current loop dynamics, etc. However, since the bandwidth requirements of the power factor are so low, these details can be ignored with the relatively low controller gains needed for this application.

Using the model shown in FIG. 2, the open-loop transfer function is:

$$G(s) = \left(K_p + \frac{K_i}{s}\right)\left(2\omega_l L \sqrt{\frac{2}{3}}\ V_{ac}\right)$$

To achieve a cross-over frequency of $f_{bw}$, the controller gains should, according to the teachings of the present invention, be selected as follows:

$$k_p = 0$$

$$k_i = \left(\frac{1}{2 f_l L \sqrt{\frac{2}{3}}\ V_{ac}}\right) f_{bw}$$

According to a discovery by the present inventor, as shown above, it is a very important teaching of the present invention that a pure integral control be used ($k_p=0$). Contrary to what would be expected, rather than a proportional-plus-integral control, it is very important for the stability of the system that a pure integral control be used. Any amount of proportional gain has been found to cause stability problems, since the plant is based on an algebraic equation. As shown in the system model of FIG. 2, the current vector out of phase with the AC line ($I_d$) as shown on a line 58a is provided by the pure integrator 56a for processing by a reactive processing block 60 which provides an output signal on a line 62 to a summer 64 which is also responsive to a signal output on a line 66 from a real processing block 68. The blocks 60, 68 represent the plus and minus quantities of the right-hand side of the $V_{dq}^2$ approximation equation discussed above. The output of the summer on a line 70a represents $V_{dq}^2$ and is fed back to a second summer 72a, where it is summed with a $V_{dq}^2$ (max) value. The summer 72a provides an error signal on a line 76a representing the difference between $V_{dq}^2$ actual and the maximum desired.

To only control the voltage magnitude when it is needed, a limit must be place in the integrator 56 which limits the output (and integrator state) to be less than zero. This will only enable reactive power to flow when it is required to lower the voltage needed to control the current.

The reference value for the power factor controller is the desired upper limit on the amplitude squared of the output voltage. Therefore, to limit the output voltage to 97.5 percent of the capability of the drive ($V_{bus}/\sqrt{3}$), the reference value ($V_{dq}^2$(max)) should be set to 0.95 $V_{bus}^2/3$.

Figure 3:
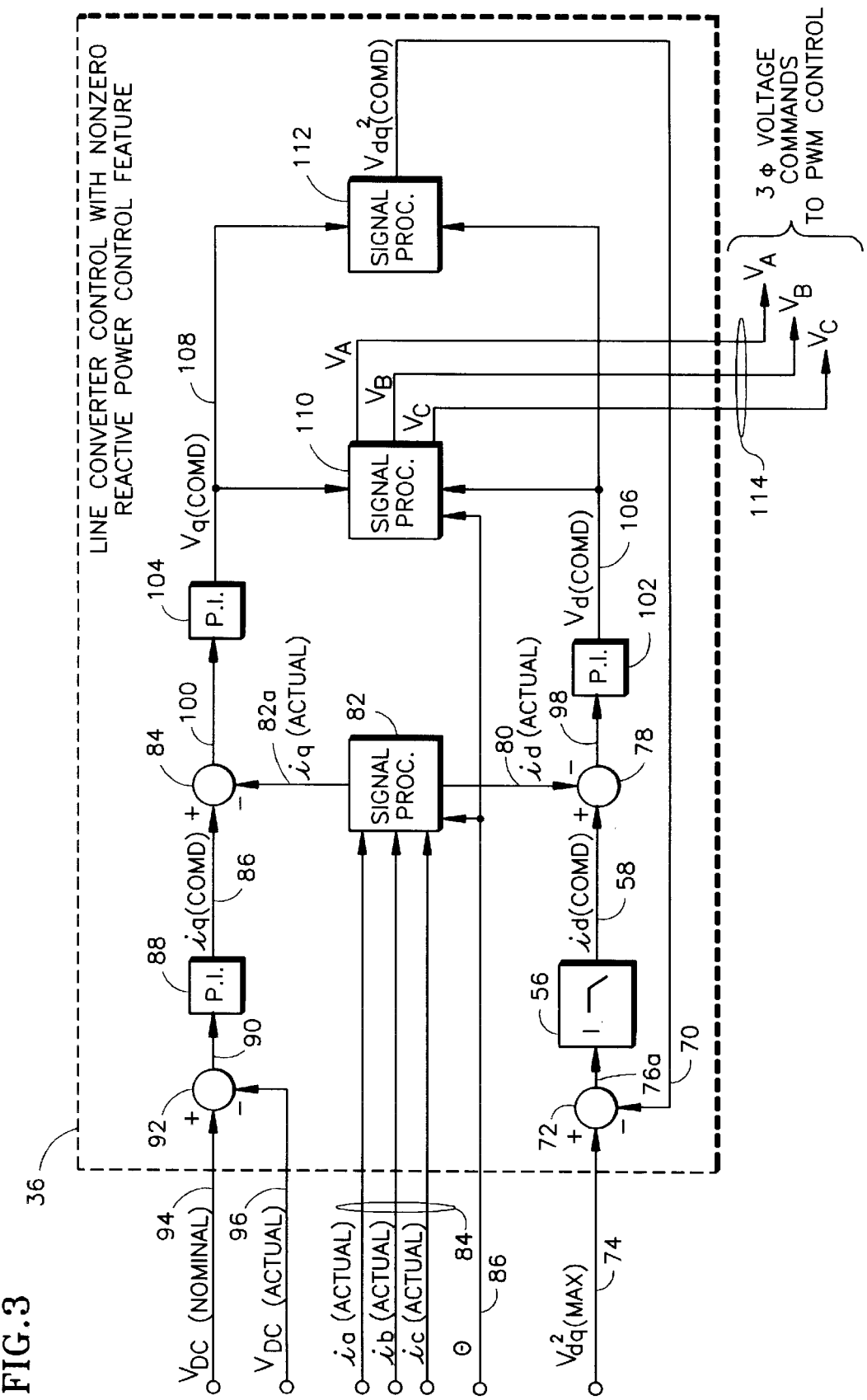
FIG. 3 shows the line converter controller of FIG. 1, according to the present invention, in more detail.

Referring now to FIG. 3, the line converter controller 36 of FIG. 1, according to the present invention, is illustrated in more detail. Keeping in mind the principles discussed in connection with FIG. 2, a $V_{dq}^2$ max signal 74 is provided on a line 74 as a constant having a constant signal magnitude and which is presented to the summer 72 which is similar to the summer 72a of FIG. 2. It too is responsive to a $V_{dq}^2$ command signal on a line 70 for providing an error signal on a line 76 to a pure integrator 56 with a limit placed in the integrator as indicated which limits the output (and integrator state) in this case to be less than zero so as only to control the voltage magnitude when it is needed. As discussed above, in connection with FIG. 2, this will only enable reactive power to flow when it is required to lower the voltage needed to control the currents.

The id command signal on the line 58 from the pure integrator 56 is provided to a summing junction 78 where it is summed with an id actual signal on a line 80 provided by a signal processor 82. A plurality 84 of sensed line current signals are provided to the signal processor 82 along with a signal on a line 86 indicating the angle of rotation of voltages on the line. This is provided by a phase lock loop 88 shown in FIG. 1 which is in turn responsive to the line voltages, as shown. The rotation signal on the line 86 ensures that the signal processor 82, which may include a current controller, is designed to operate in a synchronous reference frame.

The actual reactive current id on the line 80 has its real counterpart in an actual real current signal iq (actual) on a line 82a provided to a summer 84 along with a real command current signal on a line 86. A proportional-integral control 88 is responsive to an error signal on a line 90 for providing the real current command signal on the line 86. A summer 92 provides the error signal on the line 90 in response to the difference between a signal on a line 94 having a magnitude indicative of the nominal voltage of the DC bus 28 of FIG. 1, e.g., 750 VDC, and an actually sensed DC bus voltage on a line 96 labelled $V_{DC}$ (actual).

The summers 78, 84 provide respective error signals on lines 98, 100 to respective proportional-integral amplifiers 102, 104 for providing respective reactive and real voltage command signals on lines 106, 108 to a pair of signal processors 110, 112. The processor 110 is also responsive to the rotation signal on the line 86 and provides a plurality of three-phase voltage command signals on a plurality of lines 114 to a corresponding plurality of pulse-width modulation phase controllers within the PWM control 34 of FIG. 1, as shown, for controlling the switching of respective switches 38, 40, 42, 44, 46, 48 in order to control the transfer of power between the AC and DC buses on either side of the line converter in the desired manner.

According to the above-described $V_{dq}^2$ equation, the signal processor 112 is responsive to the real and reactive voltage command signals 108, 106 for providing the $V_{dq}^2$ command signal on the line 70 to the summer 72 for the purpose described previously. It is similar to the processor 110 in providing the converter command voltage, albeit in a different form. They could be viewed equivalently for some purposes, however, as will be appreciated by those of skill in the art.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method of controlling a regenerative drive having line and load converters connected by a direct current (DC) link, the load converter for connection to an alternating current (AC) machine and the line converter for connection to an AC source/sink by means of line reactors, comprising the steps of:

controlling real power flow in the line reactors for controlling a voltage of said DC link at a selected magnitude; and summing a line converter AC voltage command signal and a selected maximum line converter AC voltage signal for providing a control signal having a magnitude indicative of a difference between said line converter AC voltage command signal and said maximum line converter AC voltage signal; and causing, in response to said control signal, reactive power to flow in the line reactors to reduce the line controller AC voltage required to control the real power flow.

2. A method of controlling a line converter (24) of a regenerative drive controlled by a line converter control for providing line converter phase voltage command signals for controlling said line converter by means of pulse width modulation, said line converter for connection by means of line reactors to an AC source/sink (26), comprising the steps of:

summing (92) a commanded DC link (28) voltage (94) and an actual DC link voltage (96) for providing a real current command signal (86) having a magnitude indicative of a difference between said commanded DC link voltage and said actual DC link voltage;

summing (84) said real current command signal (86) and an actual real current signal (82a), for providing a real voltage command signal (108) having a magnitude indicative of a difference between said real current command signal and said actual real current signal;

summing (72) a maximum line converter voltage (74) and a commanded line converter voltage (70), for providing an error signal (76a) having a magnitude indicative of a difference between said maximum line converter voltage and said commanded line converter voltage;

integrating said error signal without any proportional gain for providing a reactive current command signal (58);

summing (78) said reactive current command signal (58) and an actual reactive current signal (80), for providing a reactive voltage command signal (106) having a magnitude indicative of a difference between said reactive current command signal and said actual reactive current signal;

squaring said real voltage command signal (108), squaring said reactive voltage command signal (106), and summing said squared reactive voltage command signal and said squared real voltage command signal, for providing the commanded line converter voltage (70); and processing (110) said real voltage command signal (108) and said reactive voltage command signal (106), for providing said line converter phase voltage command signals (114).

3. A regenerative drive for connection to an alternating current (AC) machine (12), and for connection to plural line inductors ($L_a$, $L_b$, $L_c$) connected to an AC source/sink (26), said plural line inductors for conducting AC, said regenerative drive comprising:

a line converter (24), responsive to line AC from the plural line inductors, for providing direct current (DC) to a DC link (28) having a capacitor (33) thereacross;

a load converter (30), responsive to DC from the DC link, for converting the DC from the DC link to motoring AC and for providing said motoring AC to the AC machine in a motoring mode and responsive to regenerative AC from the AC machine in a regenerative mode, for converting said regenerative AC to DC for providing DC to the DC link, wherein said line converter is responsive to DC from the DC link with said AC machine in said regenerative mode, for converting said DC to AC and providing said AC for conduction via the plural line inductors to the AC source/sink; and a line converter control (36), responsive to a plurality of input signals for providing a plurality of output signals for controlling said line converter for controlling said AC conducted on said plural line inductors, characterized in that an integral control loop is used to control a reactive part of said AC conducted on said plural line inductors to reduce a line converter voltage required to control a real part of said AC conducted on said plural line inductors, without any proportional gain in said control loop.

4. Method of controlling a line converter of a regenerative drive for connection by means of line reactors to an alternating current (AC) source/sink having a line voltage that fluctuates about a nominal value in a tolerance band, comprising the steps of:

determining that a commanded or sensed line converter AC voltage exceeds a level due to said line voltage rising above said nominal value in said tolerance band, and thereafter causing reactive current to flow, as well as real current, in the line reactors to reduce a line converter AC voltage required to control the real current.

5. Apparatus for controlling a line converter of a regenerative drive for connection by means of line reactors to an alternating current (AC) source/sink having a line voltage that fluctuates about a nominal value in a tolerance band, comprising:

means for determining that a commanded or sensed line converter AC voltage exceeds a level due to said line voltage rising above said nominal value in said tolerance band; and means for causing reactive current to flow, as well as real current, in the line reactors to reduce a line converter AC voltage required to control the real current.

* * * * *